United States Patent
Champ et al.

[15] 3,697,492
[45] Oct. 10, 1972

[54] ACRYLONITRILE POLYMERIZATION

[72] Inventors: Antony E. Champ; Charles Malcolm Hendry, both of Charlotte, N.C.

[73] Assignee: Celanese Corporation, New York, N.Y.

[22] Filed: June 16, 1969

[21] Appl. No.: 833,538

[52] U.S. Cl. ............... 260/85.5 ES, 260/29.6 AN, 260/78.5 N, 260/79.3 MU, 260/80.3 R, 260/85.5 ZA, 260/85.5 XA, 260/88.7 R, 260/88.7 D
[51] Int. Cl. ................... C08f 3/76, C08f 15/38
[58] Field of Search .260/29.6 AN, 79.3 MU, 85.5 R, 260/85.5 N, 88.7 F, 88.7

[56] References Cited

UNITED STATES PATENTS

| | | | |
|---|---|---|---|
| 3,053,806 | 9/1962 | La Combe | 260/49 |
| 3,328,333 | 6/1967 | Dannelly | 260/30.4 |
| 3,375,237 | 3/1968 | Baizer | 260/88.7 |
| 3,395,133 | 7/1968 | D'Alelio | 260/88.7 |
| 3,449,286 | 6/1969 | Szita | 260/30.4 |

*Primary Examiner*—Joseph L. Schofer
*Assistant Examiner*—C. A. Henderson, Jr.
*Attorney*—Thomas J. Morgan, Stephen D. Murphy and Herbert M. Adrian, Jr.

[57] ABSTRACT

A method of polymerizing acrylonitrile polymers if a novel aqueous, organic reaction medium in which the monomeric reactants are soluble whereas the polymerized acrylonitrile is insoluble under the polymerization conditions. On changing the polymerization conditions to polymer shaping conditions, the polymer becomes soluble in the reaction medium. The organic portion of the polymerization medium is a lower alkyl nitrile solvent of two to four carbon atoms, preferably acetonitrile, in an amount of 10 to 90 percent by weight of the solvent solution with the residual amount being water. The process is particularly suitable for continuous reaction wherein an effluent mixture of polymer solids and aqueous organic solution is continuously withdrawn from the reaction medium and converted to a homogeneous polymer solution suitable for extrusions such as in the production of shaped articles by heating the mixture of solvent and polymer under a superatmospheric pressure at least equal to the autogeneous pressure of the solution to temperatures above the boiling point of the lower alkyl nitrile-water phase. The process is suitable for the production of as high acrylic polymers containing 85 percent or more acrylonitrile.

9 Claims, 1 Drawing Figure

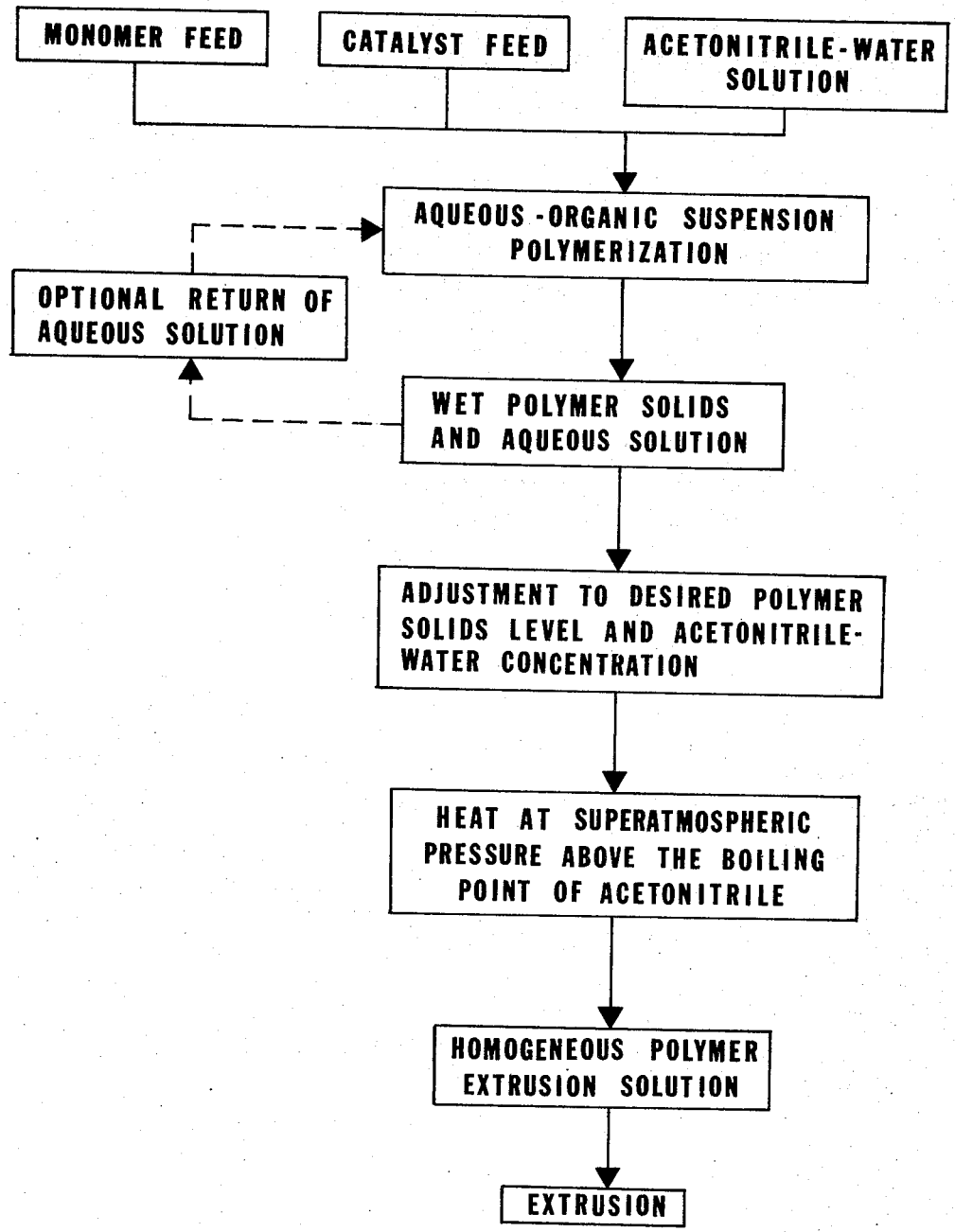

ACRYLONITRILE POLYMERIZATION

BACKGROUND OF THE INVENTION

This invention relates to the preparation of acrylonitrile polymers in a novel reaction medium which reaction medium is a solvent for the monomer reactants while being a nonsolvent for the resulting polymer under the polymerization condition. However, under certain other conditions described hereinafter, the polymerization solvent can be made to serve as the solvent for the polymer, thus providing a homogeneous polymer solution particularly suitable for extrusion into shaped articles.

Numerous methods have been described for the preparation of acrylonitrile polymers. Such polymerization reactions generally are either solution or suspension polymerizations. The present method is best classified as a suspension polymerization, but it is unique in the solvent system utilized, particularly because the solvent under the polymerization conditions does not dissolve the resulting polymer and thus, the polymer precipitates as it is formed from the solution. By changing the conditions of temperature and pressure, the same solvent can be subsequently utilized to form extrusion solutions, thereby making the present process particularly adapted for continuous polymerizations and extrusions of acrylonitrile polymers, copolymers, terpolymers and the like.

THE INVENTION

In accordance with the invention, a process is provided for producing an acrylonitrile polymer comprising continuously polymerizing acrylonitrile monomer with at least one other ethylenically unsaturated monomer copolymerizable with acrylonitrile in a proportion to yield a polymer of at least 85 weight percent acrylonitrile and from about 0.1 up to 15 weight percent of said copolymerizable monomer in a solvent solution for acrylonitrile monomer and said copolymerizable monomer in the presence of a polymerization catalyst, said solvent comprising a mixture of a lower alkyl nitrile of two to four carbon atoms and water wherein the nitrile portion of the solvent equals about 10 to 90 percent by weight and the residual amount is water. The polymerization is preferably carried out, under acidic pH conditions at a temperature of about 15° C to the atmospheric boiling point of the solvent, precipitating polymerized acrylonitrile polymer from said solution as it is formed and recovering said produced polymer. In a preferred embodiment, the polymer and solvent mixture is removed from the polymerization zone, the polymer-solids concentration adjusted to 30 to 70 percent polymer by weight with the remaining portion totaling 100 percent being solvent, said solvent portion comprising about 2 to 40 percent by weight of water and 60 to 98 percent by weight nitrile, preferably acetonitrile, and heating said mixture under at least autogeneous pressure to a temperature of 90° to 170° C thereby forming a homogeneous polymer solution.

The present method is particularly applicable to high acrylonitrile polymers containing more than 85 percent acrylonitrile. A particular advantage of the present method is the capability of utilizing a completely integrated polymerization and dope preparation system which eliminates previous requirements of drying the polymer or even effecting a change in the liquid medium which under certain conditions acts as a solvent. A further distinct advantage resides in the utilization of a low boiling, previously considered nonsolvent for high polyacrylics to serve as both the polymerization monomer solvent and subsequently as the polymer solvent. When used in extrusion processes such as in dry spinning fibers, extruding moldings, and the production of the like shaped articles, the low boiling solvent is particularly advantageous in overcoming previous difficulties encountered with conventional high boiling solvents which are not readily removed from the extruded article in dry spinning operations.

DETAILS OF THE INVENTION

The invention is more clearly described by reference to the drawing which is a flow sheet describing a preferred method of integrating the present process into a continuous polymerization and dope preparation system.

As such, the process will be described more particularly with respect to the most preferred nitrile, e.g., acetonitrile. Accordingly, acrylonitrile monomer is continuously fed to an aqueous suspension polymerization reactor along with acetonitrile and water in the described proportions, catalyst, initiator and the like feed materials. Polymerization is promoted by the catalyst system, as well as the preferred acidic pH conditions and the temperature of the reactants. As is normal for such reactions, the reaction rate is largely temperature dependent. Higher temperatures result in faster reaction rates.

The polymerizable monomers used are soluble in the aqueous acetonitrile medium at the concentrations normally used and the temperatures employed. As polymer is polymerized, it precipitates as a solid which is readily removed continuously or periodically from the reaction medium. This is accomplished by removing a slurry of polymer and the acetonitrile-water solution which can be directly used to form the homogeneous extrusion solution. Alternatively, modifications of this procedure can be used such as decanting or filtering the solids off along with a certain amount of the aqueous medium. The polymerized product can be waterwashed, if desired, to remove unreacted monomer and catalysts which adheres to the polymer. However, the removal of catalysts, etc. is not necessary because the polymerization normally ceases on the depletion of available monomer, change in the pH conditions, neutralization of the catalyst and the like as is well known to those skilled in the art.

Referring more specifically to the details involved in the present invention, the present invention can be utilized with high acrylonitrile polymers containing at least about 85 percent or more acrylonitrile including homopolymers. Such polymers are well known in the art and normally are used in fiber production as copolymers, terpolymers and higher copolymerized products. Typically, varying amounts of other copolymerizable monomers are added to produce the co- and ter- polymers. Typically, ethylenically unsaturated monomers, such as methylacrylate, methyl methacrylate, vinyl acetate, vinylidene chloride methylallyl alcohol, vinylidene cyanide, styrene sulfonic acid materials, other dye site containing monomers such as sodium methylallyl sulfonate, disodium allyl phosphate and the like can be used. With high acrylics, the amount of copolymerized monomer is up to about 15 percent, but more generally in the range of about 1 to 10 percent by weight. While sulfur-containing monomers are preferred to enhance the dyeability of the end polymer, other dye-enhancing compounds can be used such as those containing a phosphorous group or other dye-enhancing group, as are well known in the art.

The monomer concentration is maintained in the reaction medium in about the molar proportions desired in the resulting polymer and at a level sufficient to promote a rapid and continuous polymerization thereof. The monomer amount is maintained at a level whereby the monomer is substantially in solution at the reaction temperature. Thus, the monomer concentration can vary from about 1 to 40 percent or more, but is generally in the range of about 2 to 25 percent by weight of the reaction medium.

The reaction medium is an aqueous solution of about 10 to 90 percent weight percent lower alkyl nitrile, such as acetonitrile, with the residual amount totaling 100 percent being water. It is usually most desirable to have the proportions of acetonitrile and water equal to about the proportions which are subsequently used in the homogeneous extrusion solution desired hereinafter, thereby reducing or eliminating large liquid adjustments between the polymerization stage and the production of the homogeneous extrusion solution.

The reaction medium is preferably acidified to promote the reaction by the addition of acidic compounds, particularly acids such as $H_2SO_4$. A pH range of about 2 to 5, and more preferably 3 to 4, has been found to be most desirable.

The catalysts preferably used in the present invention are free radical generating catalysts. Actinic radiation can also be used to promote the polymerization if desired. However, conventional free radical generating catalysts, such as organic and inorganic peroxides, are particularly useful. In general, any suitable acrylic catalyst polymerization system can be used, particularly those soluble in the reaction mixture. The particular catalyst selected should preferably be sufficiently active at the polymerization temperatures, e.g., below the atmospheric boiling point of the acetonitrile-water reaction medium, e.g., about 82° C, and more preferably in the range of 15° to 80° C. In order to obtain a high productivity, a satisfactory molecular weight, a desirable slurry consistency, that is, less than about 50 stokes, desired molecular weight distribution and polymers of good color, temperatures of about 35° to 60° C are most preferred.

The polymerization catalyst may be of any suitable type including, for example, free radical-yielding catalysts, such as organic peroxides, represented by, for example, benzoyl peroxide, acetyl peroxide, lauroyl peroxide, succinyl peroxide, acetyl benzyl peroxide, oleayl peroxide, urea peroxide, di-t-butyl peroxide, dichlorobenzoyl peroxide, $\alpha$-dicumyl peroxide; organic hydroperoxides, such as t-butyl hydroperoxide, cumene hydroperoxide, $\alpha$-$\alpha$-dimethylbenzyl hydroperoxide and t-isopropyl benzene hydroperoxide; azo compounds, such as dimethyl $\alpha$-$\alpha$-azodiisobutyrate, $\alpha$-$\alpha$-azodiisobutyronitrile, and azodicyclohexyl carbonitrile; inorganic oxidizing agents, such as hydrogen peroxide, alkali metal and ammonium persulfates, percarbonates, perborates, nitrates, chlorates, perchlorates, etc. (especially sodium, lithium and potassium derivatives), and further including the corresponding alkyl salts; ionic free radical catalysts, such as ferrous ion and hydrogen peroxide, ferrous ion and cumene hydroperoxide, peroxydisulfate and thiosulfate ion, hydrogen peroxide and zinc formaldehyde sulfoxylate, hydrogen peroxide and a trivalent titanium salt, potassium persulfate and sodium bisulfite, trivalent titanium and hydroxylamine in acid solution, ammonium persulfate and sodium metabisulfate, a bromate mixed with a bisulfite, etc.

The per compounds are used in quantities from about 0.1 to 3 percent by weight, based on the polymerizable monomers, and the reducing agents in quantities from 0.3 to 6 percent by weight. In many instances, heavy metal compounds e.g., $Fe^{++}$, used in small quantities, have proved to be effective accelerators.

In addition to the salts used as Redox catalysts, suitable neutral salts, such as alkali metal sulphates and phosphates, may be present in the polymerization mixture as polymerization regulators. If desired, polymerization regulators, including chain transfer agents and terminators, such as aliphatic mercaptans, optionally those containing a hydroxyl group near the sulphydryl group, for example, thioglycol, may also be used in the process according to the invention.

In general, the polymerization is conducted under an atmosphere of inert gas, such as nitrogen or $CO_2$. Also, if desired, the reaction may be effected under super or subatmospheric pressures, although atmospheric pressure is normally preferred.

For fiber end uses of the polymer, which is most often preferred, the polymerization is effected to obtain an inherent viscosity (I.V.) of about 0.3 to 2.5 and more preferably at least about 0.5 and most preferably, 1.2 to 1.8 as measured in a 0.1 percent solution of polymer in N, N'dimethylformamide. Of course, higher I.V.'s can be used, but normally they result in excessive viscosities and no particular improvement in fiber properties. Where higher I.V.'s are desired, the aforementioned higher concentrations of water are usually preferred in the reaction medium. For other uses, such as coatings, the lower I.V.'s are often preferred.

Polymerized polymer withdrawn from the reaction medium, either as a wet polymer or a slurry in the acetonitrile-water reaction solution, is formed into a homogeneous extrusion solution by adjusting the solids content to the desired range, which can be 20 to 70 percent solids by weight. Because of the unusual solubility characteristics of the acetonitrile-water mixture, when high acrylonitrile polymer is used, a higher solids level is used, such as above about 30 percent, to obtain a homogeneous one-phase solution be a result of the solvent solution being absorbed into the polymer rather than the polymer being dissolved in the solvent under the solutioning conditions described hereinafter. Thus, for high acrylics, solid contents above about 35 percent up to about 70 percent are the most preferred. For a typical fiber spinning operation, a polymer solids content of about 30 to 45 percent has been found to be particularly desirable.

With the polymer solids level selected for the particular extrusion process contemplated, the acetonitrile-water composition to complete the extrusion composition is selected depending on the end use of the dope solution and the desired viscosity at the extrusion temperature, the inherent viscosity of the polymer, the polymer composition and the like consideration. The water apparently acts with the acetonitrile to lower the solubility temperature and also effects the viscosity of the resulting solution. Therefore, it is desirable that a certain portion of the solvent system be water. Depending upon the particular polymer used, the proportion of water in the acetonitrile-water solvent system is about 2 to 40 percent water, more preferably, about 18 to 27 percent water with the remaining amount being acetonitrile. If desired, small additions of other solvents can also be used, but normally they are not needed. As discussed above, it is sometimes desirable to obtain I.V.'s in excess of about 1.0, and therefore, a water content of 50 to 90 percent for the reaction medium is more desirable.

Because the acetonitrile-water system is not a solvent for high acrylics under conventional temperatures and pressures, a homogeneous dope solution is prepared by heating the mixture under superatmospheric pressure to above the boiling point of the acetonitrile and more preferably above the azeotropic boiling point of acetonitrile and water. Typically, the pressure required is at least the autogeneous pressure developed by the solvent system, thereby maintaining the solvent system in the liquid phase. While the autogeneous pressure is sufficient it is often convenient to increase the pressure up to about 100 pounds per square inch gauge or more above the autogeneous pressure as may be particularly desired in the particular solvating and extrusion system utilized. In the same manner, the heat utilized is normally dependent upon the particular polymer and the ease of solubility thereof, the proportions of water and acetonitrile which tend to dictate the solubilizing temperature and the like considerations.

Thus, the polymer is best heated to a temperature in the range of about 100° to 150° C, and more preferably in the range of about 110° to 130° C to effect the homogeneous solutioning thereof.

Having formed the homogeneous polymer solution, the temperature and pressure is maintained thereon to retain the solution in a liquid state, the release of pressure results in the rapid evaporation of the solvent and the consequent rapid solidification of the polymer. In the same manner, the lowering of the temperature drops the polymer below its solubility temperature thereby also solidifying the polymer. Therefore, it is most convenient to pass the homogeneous dope solution directly to an extrusion process wherein shaped articles are made of the acrylic polymer. If desired, the prepared solution can be cooled and solidified and subsequently reheated under pressure to again liquify the dope.

The invention will be more fully described by reference to the following example, which illustrates certain embodiments of the present invention. Unless otherwise indicated, all temperatures are in degrees centigrade and all parts are by weight in the example and the appended claims.

EXAMPLE

The process of the present invention is operated in accordance with the drawing to produce a high acrylic polymer comprised of about 95 percent acrylonitrile and 5 percent methylacrylate. The reaction is initiated by charging a reactor having agitation means therein with approximately 6 parts of methyl acrylate, 110 parts of acrylonitrile and 380 parts of acetonitrile-water mixture comprising 78/22 weight by weight acetonitrile-water. The reaction temperature is brought to about 65° C. Continuous reaction can be achieved by maintaining a monomer feed in the noted proportions and allowing the polymer solids level to build up to about 200 parts by weight. A persulfate-metabisulfite catalyst system is used with the pH controlled at about 3.5.

Polymer solids precipitated from the reaction medium as they exceeded their solubility level in the reaction solution. Upon achieving a polymer I.V. in excess of 0.45, the reaction was terminated. The resulting polymer at a 40 percent solids content in the 78/22 acetonitrile-water solution is then sealed in a pressure vessel and heated with mixing to about 95° C at which point the material changed from a liquid-solid phase into a gel. Continued heating to about 100° C produced a homogeneous fluid solution. The resulting fluid solution could be cooled to as low as about 80° C without solidifying the solution provided at least autogeneous pressure is maintained. However, it is preferred to maintain a temperature of about 100° to 130° C and convey the homogeneous fluid solution directly to the extrusion process.

In the extrusion process, the release of the superatmospheric pressure as the polymer solution is extruded results in the rapid evaporation of the solvent and the solidification of the polymer. In the same manner, the dropping of the temperature below the solubility point, e.g., below about 80° C, also results in the solidification of the polymer.

In the same manner, greater and lesser amounts of water as described herein are utilized in the solvent system to achieve correspondingly good results. Changes in the water concentration changes the initial solubility temperature and the subsequent solidification temperature of the polymer.

Also, to obtain higher I.V. polymers, larger amounts of water are preferably used in the reaction medium such as 50 to 90 percent water and 10 to 40 percent acetonitrile. Such higher I.V. polymers are preferred for fiber forming extrusion processes.

While the invention has been described with reference to the preferred acetonitrile solvent because of its high volatility at comparatively low temperatures coupled with excellent solvating power for high acrylics under the conditions disclosed herein, other lower alkyl, particularly n-lower alkyl nitriles containing 3 to 4 carbon atoms may be employed wherein desired. However, in such instance, higher temperatures and/or pressures are required for solvation and the advantage of high solvent volatility at dry spinning temperatures is somewhat lessened. Thus, in place of acetonitrile or in combination therewith, propionitrile, butyronitrile and isobutyronitrile, for example, and mixtures thereof can be used.

While the invention has been described in its most preferred embodiments, various modifications will

What is claimed is:

1. A process for producing an acrylonitrile polymer consisting essentially of polymerizing acrylonitrile monomer with at least one other ethylenically unsaturated monomer copolymerizable with acrylonitrile in a proportion to yield a polymer of at least 85 weight percent acrylonitrile and from about 0.1 up to 15 weight percent of said copolymerizable monomer in a solvent solution for said acrylonitrile monomer and said copolymerizable monomer in the presence of a polymerization catalyst, said solvent consisting essentially of a mixture of a lower alkyl nitrile having two to four carbon atoms and water, wherein the nitrile portion of the solvent equals about 10 to 90 percent by weight and the residual amount is water.

2. The process of claim 1 further comprising effecting said polymerization under acidic pH conditions at a temperature of about 15° C to the atmospheric boiling point of the solvent, precipitating acrylonitrile polymer from said solution as it is formed, removing said produced polymer and the solvent mixture from the polymerization zone, adjusting the polymer-solids concentration to 30 to 70 percent by weight polymer solid with the remaining portion totaling 100 percent being solvent, said solvent portion consisting essentially of from about 2 to 40 percent by weight water and from about 60 to 98 percent by weight acetonitrile, heating said mixture under a superatmospheric pressure of at least equal to the autogeneous pressure of the mixture to a temperature of from about 90° to 170° C, and forming a homogeneous polymer solution.

3. The process of claim 2 wherein the lower alkyl nitrile is acetonitrile.

4. The process of claim 3 wherein the polymerization reaction resident time and temperature is sufficient to produce an acrylonitrile polymer having an inherent viscosity of at least about 0.4.

5. The process of claim 2 wherein the proportion of acetonitrile to water in the polymerization stage is about equal to the proportion of acetonitrile to water in the homogeneous polymer solution.

6. The process of claim 2 wherein acrylonitrile polymer is a fiber forming polymer and the homogeneous polymer solution is dry spun into a fiber.

7. The process of claim 6 wherein the polymerization, solvation and spinning into a fiber is operated as a continuous integrated process.

8. The process of claim 2 wherein the copolymerizable monomer is methyl acrylate.

9. The process of claim 3 wherein the acrylonitrile monomer is copolymerized with another ethylenically unsaturated sulfonic group containing monomer in an amount of 0.1 to 5 weight percent of the polymer.

* * * * *